(12) United States Patent
Yeo

(10) Patent No.: US 6,537,934 B1
(45) Date of Patent: Mar. 25, 2003

(54) ADHESIVE COMPOSITIONS AND COMPOSITE MATERIALS

(76) Inventor: Siew Puat Yeo, Block 2, Delta Avenue, #14-40, Singapore (SG)

(*) Notice: Subject to any disclaimer, the term of this patent is extended or adjusted under 35 U.S.C. 154(b) by 0 days.

(21) Appl. No.: 09/446,085

(22) PCT Filed: Jun. 10, 1998

(86) PCT No.: PCT/SG98/00043
§ 371 (c)(1),
(2), (4) Date: Dec. 15, 1999

(87) PCT Pub. No.: WO98/58033
PCT Pub. Date: Dec. 23, 1998

(30) Foreign Application Priority Data

Jun. 17, 1997 (SG) .................................... SG9702075-04

(51) Int. Cl.$^7$ .............................. B32B 5/02; B32B 5/28; B32B 5/18; B32B 7/12
(52) U.S. Cl. .................. 442/149; 442/76; 442/226; 442/227; 442/315; 442/374; 442/375; 428/317.1; 428/317.7
(58) Field of Search ............................ 428/317.1, 317.7; 442/76, 149, 221, 224, 226, 227, 315, 370, 373, 374, 375

(56) References Cited

U.S. PATENT DOCUMENTS

| | | | | |
|---|---|---|---|---|
| 3,269,887 A | * | 8/1966 | Windecker | 156/242 |
| 3,804,653 A | * | 4/1974 | Morris et al. | 106/157.2 |
| 4,957,798 A | * | 9/1990 | Bogdany | 156/307.3 |
| 4,990,541 A | * | 2/1991 | Nielsen et al. | 521/134 |
| 5,403,884 A | * | 4/1995 | Perlinski | 523/300 |

FOREIGN PATENT DOCUMENTS

| | | | |
|---|---|---|---|
| FR | 2147839 A | * | 3/1973 |
| GB | 1076130 A | * | 7/1967 |
| GB | 1177483 A | * | 1/1970 |
| WO | WO 9102777 A | * | 3/1991 |
| WO | WO 96/37551 | * | 11/1996 |

OTHER PUBLICATIONS

Alger, Mark. Polymer Science Dictionary 2$^{nd}$ Edition, Chapman & Hall London. 1997. p 480.*

* cited by examiner

Primary Examiner—Terrel Morris
Assistant Examiner—Jenna-Leigh Befumo
(74) Attorney, Agent, or Firm—Abelman, Frayne & Schwab

(57) ABSTRACT

A composite material is formed from a flexible porous hardening foam (e.g. polyurethane) and an adhesive composition which sets to a water-resistant film and contains a water-absorbent filler (e.g. fumed silica) in an amount such that the film is water absorbent. The adhesive reinforces the foam while preserving its porosity and absorbency. The material is suitable for shoe insoles and handgrips. The adhesive may be primarily in a surface layer e.g. of cloth (14) applied to the foam (12); or the foam (22) may be saturated with the composition prior to curing.

14 Claims, 1 Drawing Sheet

ADHESIVE COMPOSITIONS AND COMPOSITE MATERIALS

Figure 1:
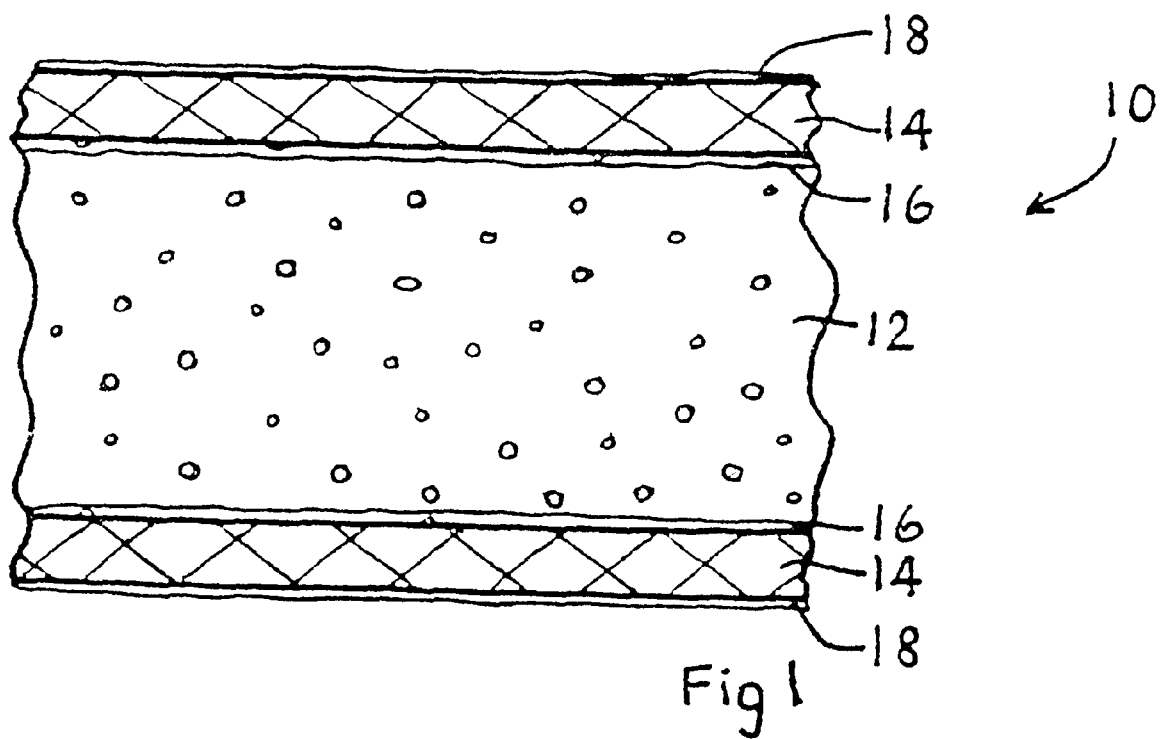

The present invention relates to adhesive compositions and to composite materials made from such adhesive compositions and solid foam materials. In further aspects it relates to methods of making such composite materials, and articles made from them. The invention is primarily concerned with composite materials which are porous, resiliently compressible, and water resistant. Such materials may be particularly suitable for the manufacture of insoles and handgrips (e.g. for sports rackets).

The most widely used solid foam materials are polyurethane foams. As is well known, these can be produced with a wide range of rigidity (from very soft to rigid) and a wide range of density. A further variable is whether the material is open-cell (and hence porous) or closed cell.

Low density flexible polyurethane foams are materials of density 10–80 kg/m$^3$, composed of lightly cross-linked open cells. Air can flow easily through them. They are soft, with little strength or resistance to abrasion. Their net-like surface layers make it difficult to bond them to other articles, e.g. for lamination. They are typically used as cushioning, in bedding or upholstery. In contrast, polyurethane foam materials conventionally used for shoe soling and the like are microcellular foams (i.e. denser than "high density foams"), with intermediate softness. Such materials have little if any porosity. They are generally self-skinning, which further reduces any porosity they may have. Thus they typically have to be needled if they are required to be breathable.

In one aspect the present invention enables one to reinforce a low density flexible foam while preserving substantial porosity. Use is make of a water-resistant, water-transmissive glue. This may be based on a glue which is not substantially water-transmissive, typically a latex-type adhesive, in which a water-absorbent filler has been incorporated so that a film formed from the adhesive is water absorbent.

It is known to incorporate fillers, including water-absorbent fillers, in adhesive compositions. However they are incorporated at low levels (e.g. ¼–1% w/w) and do not confer water-absorbance.

Thus in a first aspect the invention provides a composite material formed from a low density flexible plastics foam material (preferably 10–80 kg/m$^3$) and an adhesive composition comprising a water-resistant glue composition and a water-absorbent filler, the filler being incorporated in an amount sufficient to confer water absorbance on a film formed from the adhesive composition. The foam material will generally be porous, and the composite material desirably retains substantial porosity.

Generally the glue composition is a latex e.g. a styrene-butadiene-rubber ("SBR") latex (preferably carboxylated) or a dispersion based on polyurethane or acrylonitrile-butadiene or acrylics or ethylene-vinyl acetate (EVA) or copolymers or terpolymers based on any of these. Generally it will be settable or curable to a non-tacky state. That is, it is not a pressure-sensitive adhesive as used on 'self-adhesive' articles such as labels and tapes. Neither is it a remoist adhesive (as used on stamps etc.)

The glass transition temperature of the glue composition may be 10–15° (or lower if intended for low temperature use, e.g. 0° or less).

The amount of filler is preferably 5–7% of the adhesive compositions (w/w). Suitable fillers are inorganic materials of small particle size (e.g. <5 $\mu$m, preferably <1 $\mu$m.). Silica, particularly fumed silica, is currently preferred. Calcium carbonate is also usable.

The adhesive composition may be formed by mixing components A and B in approximately equal amounts by weight (e.g. 40–60% of A, 60–40% of B), where:

Component A is a latex of solid content 40–55% by weight (preferably a carboxylated SBR latex); and Component B comprises water (86–90 parts) and filler (preferably silica such as Aerosil 200) (10–14 parts). It may further include a bactericide (1–2 parts). (All parts are by weight.)

The compounded adhesive may also include a crosslinker which is reactive with carboxy and hydroxy groups, e.g. a polyfunctional aziridine such as trimethylolpropane-tris-($\beta$-(N-aziridinyl) propionate (available as XAMA-2 from EIT Inc), or CX-100 (Zeneca Resins). Use of 0.5–2% w/w of such a trifunctional linker can improve the water- and chemical-resistance and bond strength of the adhesive.

Alternative adhesive compositions which may be used are breathable adhesives or coatings. Their 'breathability' may be due to their molecular structure and is generally not dependent on fillers. Known examples include water-based polyurethane products such as Witcoflex 120 and 130 (Baxenden Chemicals). These provide water-resistant, breathable, hydrophilic coatings. However they are relatively expensive. Furthermore they tend to be too soft for various applications such as insoles.

The plastics foam material is preferably a polyurethane foam. (Other possibilities included polyethylene.) Its density is preferably 10–60 kg/m$^3$, more preferably 20–60, still more preferably 30–50 and most preferably 40–45 kg/m$^3$. It is desirably a flexible, fully open, sponge-like material. It is generally 3–12 mm thick. For use in producing insoles for normal use, thicknesses in the range 4–6 mm are preferred. Insoles for sports shoes may be up to 10 mm or more. Material for handgrips may be 3 mm thick. (Thinner foam is not readily available.)

The adhesive is preferably a filler—containing adhesive as described above or, less preferably, a breathable adhesive.

In a second aspect the invention provides an adhesive composition comprising a water resistant glue composition which is a latex or other aqueous polymer dispersion and, as a filler, fumed silica incorporated in an amount such that a film formed from the adhesive composition is water absorbent (said composition setting or curing to a non-tacky state).

In a third aspect the invention provides an insole comprising a composite material according to the first aspect.

In a fourth aspect the invention provides a handgrip (e.g. for a sports racket or hand tool) comprising a composite material according to the first aspect.

In further aspects the invention provides methods of producing composite materials according to the first aspect or articles according to the third or fourth aspect; and a method of producing or repairing a handgrip, optionally in situ on a handle. Application of a coating of an adhesive composition as used in the present invention to a foam-based handgrip, or a foam substrate for use in forming a handgrip, leads to a handgrip of enhanced durability. The filler in the adhesive composition can provide durability and good non-slip properties, as well as ensuring that the set adhesive is able to absorb moisture.

In one type of embodiment, the adhesive composition is primarily present in a fabric layer which is adhered thereby to a major surface of the foam material. Preferably the foam material is in the form of a sheet, and said fabric layers are adhered to both major surfaces. This gives a product which is reversible and washable. Preferably the fabric was soaked in the adhesive composition and the setting thereof both adhered the fabric to the foam material and provided the fabric with a protective coat. The fabric is preferably of a water-absorbent material, e.g. based on cotton (e.g. pure cotton or cotton-polyester or other known blend).

The fabric may be woven (cloth) or nonwoven. Suitable nonwovens include highly porous materials, composed of fibres of synthetic polymer materials.

In a second type of embodiment, the plastics foam material was saturated with the adhesive composition which was subsequently cured to produce a reinforced foam material. This type of embodiment generally does not have the cloth surface layer(s). The plastics foam is preferably of thickness 4 or 5–12 mm.

A preferred method of producing the first type of embodiment comprises the following steps: (a) fabric is soaked with the adhesive composition (suitably by immersion); (b) the soaked fabric is applied to the foam material and the assembly is oriented so that the fabric is on the underside; and then (c) heat is applied to the fabric, preferably using a jet of hot gas or infra red irradiation. The orientation of the assembly reduces the penetration of the adhesive composition into the foam material.

For insoles, the foam is typically about 5 mm thick and is preferably 30–40 kg/m$^3$. It may be reinforced either by the adhesion of a fabric layer to one or both faces, or by the saturation method referred to above.

For handgrips, a foam layer about 3 mm thick is preferred, and reinforcement is preferably by adhesion of a fabric layer. For providing a protective coating on a handgrip, it is preferred to use an adhesive composition according to this invention, particularly one based on a polyurethane dispersion with fumed silica as filler.

The following table compares the properties of various materials for forming insoles. "Present invention" refers to preferred embodiments of the present invention of the type consisting of polyurethane foam with cloth bonded to both faces. The adhesive used is based on a carboxy SBR latex containing silica. The cloth was saturated with the latex composition which thus provided surface protection for the cloth as well as bonding it to the foam.

Figure 2:
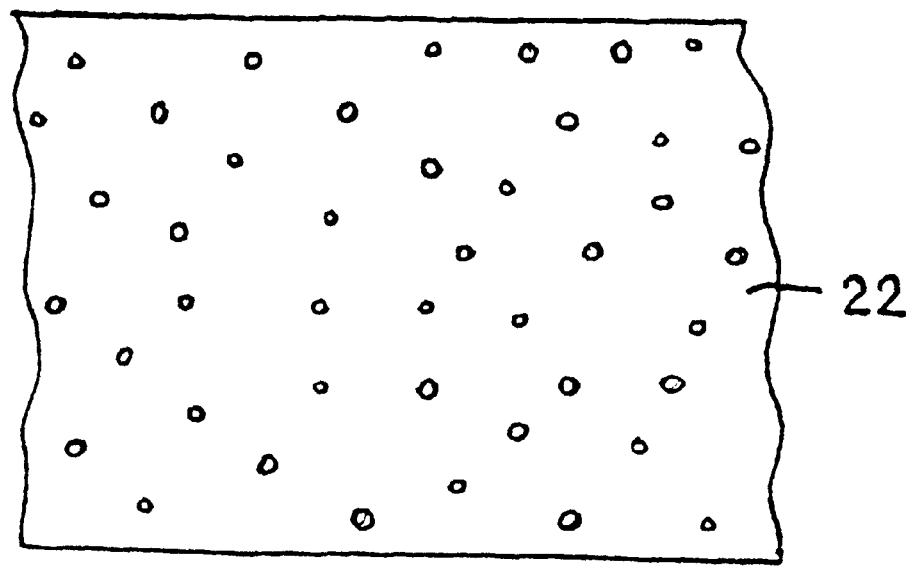

FIG. 2 is a like view of a second embodiment.

The composite material 10 shown in FIG. 1 has a core of flexible, fully open-celled polyurethane sponge 12, of thickness 6 mm. The raw material had a density of 40 kg/m$^3$. Each of the major faces carries a layer 14 of woven cotton cloth. Prior to application, the cloth was soaked with an adhesive composition (to be described later). This has soaked a small way into the foam material 12 (shown as surface layer 16). Additionally, it provides surface coating layers 18 on the outer faces of the cloth.

The adhesive composition was a carboxylated SBR latex having a glass transition temperature of 10° and a solids content of 50% w/w. It contained 6% by weight of a silica filler, namely Aerosil 200(™). It also contained a bactericide.

In the manufacture of the composite material 10, cloth was cut to provide pieces for covering the top and bottom faces of the foam. The cloth pieces were soaked in the adhesive composition. One piece of cloth was removed and laid on the upper surface of the foam composition, which was immediately inverted. Hot air was then directed at the exposed surface of the cloth 14 until the adhesive was cured. Cloth 14 was then applied to the upper face of the foam material in the same way.

FIG. 2 shows a cheaper form of composite material. It consists of a piece of polyurethane foam 22 having the same characteristics as the foam material 12 of the first embodiment, except that it is 10 mm thick. This material was immersed in the same adhesive composition as described above, and squeezed so that it became saturated. It was then removed and dried using hot air. The result is a sheet of foam that is still substantially porous, but which is much stronger and more resistant to abrasion than the untreated foam. It is also somewhat more rigid.

The composite materials as shown in FIGS. 1 and 2 may be cut to provide insoles for other shaped objects. (Alternatively, the foam could be cut before the treatment steps but this is not generally convenient). An insole (or a hand grip) is desirably porous, to allow absorption of sweat. It is clearly important that adhesive used in its production should not be water soluble. The adhesion composition used

|  | Present Invention High (6/10 mm Compressible to 2/2.5–3 mm) | Self-skinning Polyurethane Foam Moderate (3 mm compressible to 1.5–2 mm) | Cloth Laminated on Rubber Moderate | Leather, Optionally Foam Backed Moderate |
|---|---|---|---|---|
| Resilient Compressibility | | | | |
| Water Absorbance (W/W) | 400–500% | 300% | 300% | 300% |
| Air Flow Efficiency | High | Poor unless perforated after formation | | Reasonable |
| Durability | High | High | Moderate/Low | High |
| Reversibility | Yes | No | No | Yes (not if foam-backed) |
| Washability | Washable with detergent | Rinsable | Rinsable | Washable |
| Cost | Low | Low | Low | High |

Some embodiments of the invention will now be described with reference to the accompanying drawings in which:

FIG. 1 is a schematic sectional view of a composite material which is a first embodiment of the invention;

herein leads to an adhesive bond which is highly resistant to water but which is still water absorbent, due to the high content of an appropriate filler.

What is claimed is:

1. A porous, resiliently compressible and water-resistant composite material comprising (i) a layer of open-cell flexible plastic foam material having two oppositely directed major surfaces; and (ii) at least one fabric layer overlying a respective one of said major surfaces of the foam material layer, said fabric layer having been soaked in an adhesive composition which comprises a carboxylated SBR latex and 5 to 7%, by weight, of the adhesive composition of a water-absorbent filler selected from silica and calcium carbonate, whereby when the fabric layer is disposed on said major surface, the adhesive composition soaks into a surface layer of the foam material layer; the adhesive composition being subsequently cured to produce a composite material wherein the cured adhesive bonds the at least one fabric layer to the foam material layer and provides a protective coat on the outer surface of the at least one fabric layer.

2. A composite material according to claim 1 including a second fabric layer adhered to the other of said major surfaces of the foam material layer.

3. A composite material according to claim 2 wherein the plastics foam material was saturated with the adhesive composition which was subsequently cured to produce a reinforced foam material.

4. A composite material according to claim 1 wherein the adhesive composition includes a polyfunctional crosslinker which is reactive with carboxyl and hydroxyl groups.

5. A composite material according to claim 1 wherein the filler is fumed silica.

6. A composition material according to claim 1 wherein the adhesive composition includes a bactericide.

7. A composite material according to claim 1 wherein the plastics foam material is a polyurethane foam.

8. A composite material according to claim 1 wherein the density of the foam material is 10–60 $kg/m^3$.

9. A composite material according to claim 8, wherein the density of the foam material is 30–50 $kg/m^3$.

10. A composite material according to claim 9 wherein the density of the foam material is 40–45 $kg/m^3$.

11. An insole comprising a composite material according to claim 1.

12. A handgrip comprising composite material according to claim 1.

13. A porous, resiliently compressible and water-resistant composite material comprising (i) a layer of open-cell flexible plastic foam material having a density of 10 to 80 $kg/m^3$ and having two oppositely directed major surfaces; and (ii) at least one fabric layer overlying a respective one of said major surfaces of the foam material layer, said fabric layer having been soaked in an adhesive composition which comprises a carboxylated SBR latex and 5 to 7%, by weight, of the adhesive composition of a water-absorbent filler selected from silica and calcium carbonate, whereby when the fabric layer is disposed on said major surface, the adhesive composition soaks into a surface layer only of the foam material layer; the adhesive composition being subsequently cured to produce a composite material wherein the cured adhesive bonds the at least one fabric layer to the foam material layer and provides a protective coat on the outer surface of the at least one fabric layer.

14. A porous, resiliently compressible and water-resistant composite material formed from an open-cell flexible plastics foam material having density of 10 to 80 $kg/m^3$ and an adhesive composition comprising a carboxylated SBR latex incorporating a polyfunctional aziridine crosslinker and a water-absorbent filler selected from silica and calcium carbonate, the filler being incorporated in an amount of 5 to 7%, by weight, of the adhesive composition.

* * * * *